Figure 1:
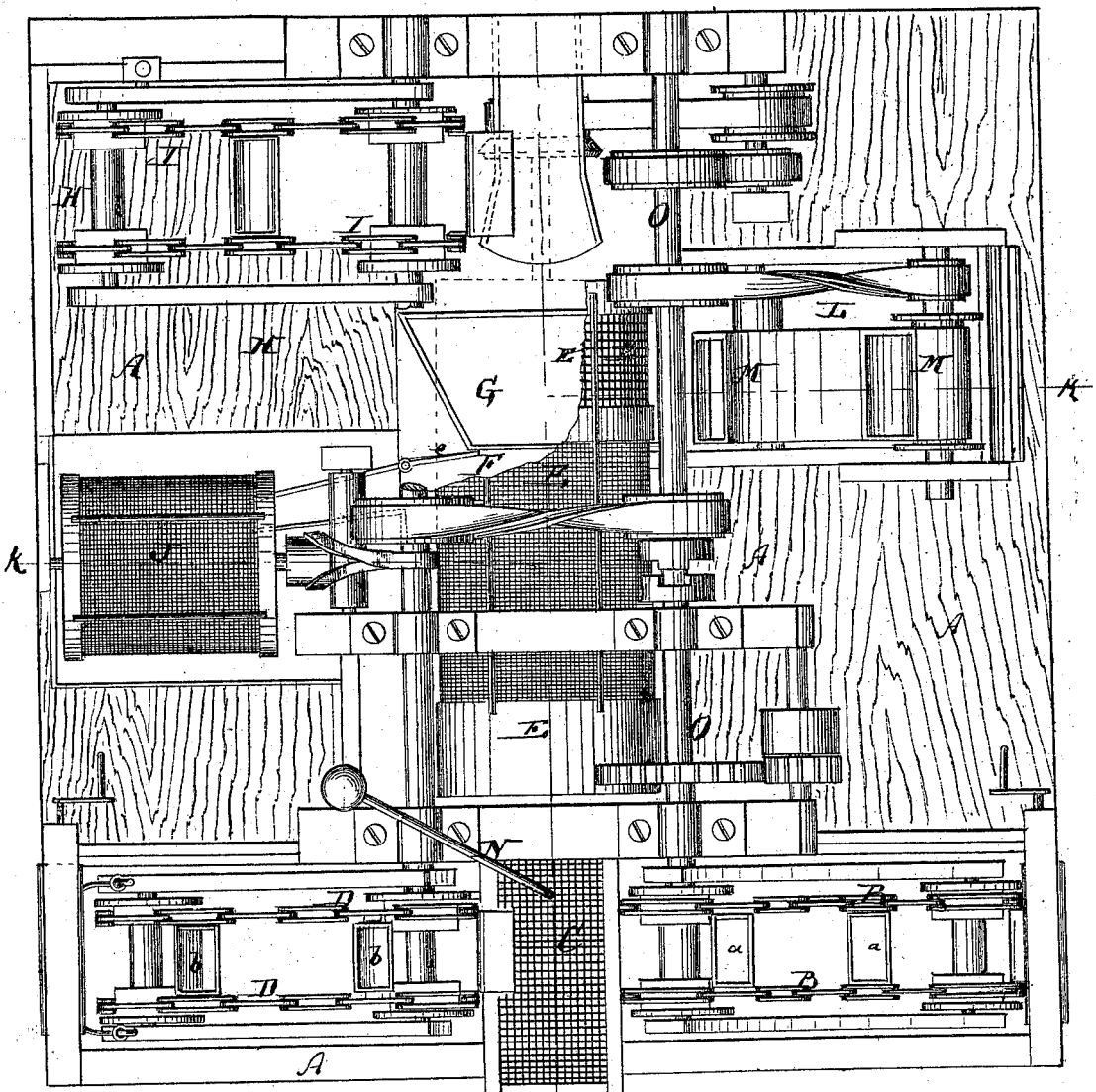

N. J. KELLER.
Improvement in Sand and Gravel Separating-Machines.
No. 126,968. Patented May 21, 1872.

Witnesses:
Chas. Nida
Geo. W. Mabee

Inventor:
N. J. Keller
per
Attorneys.

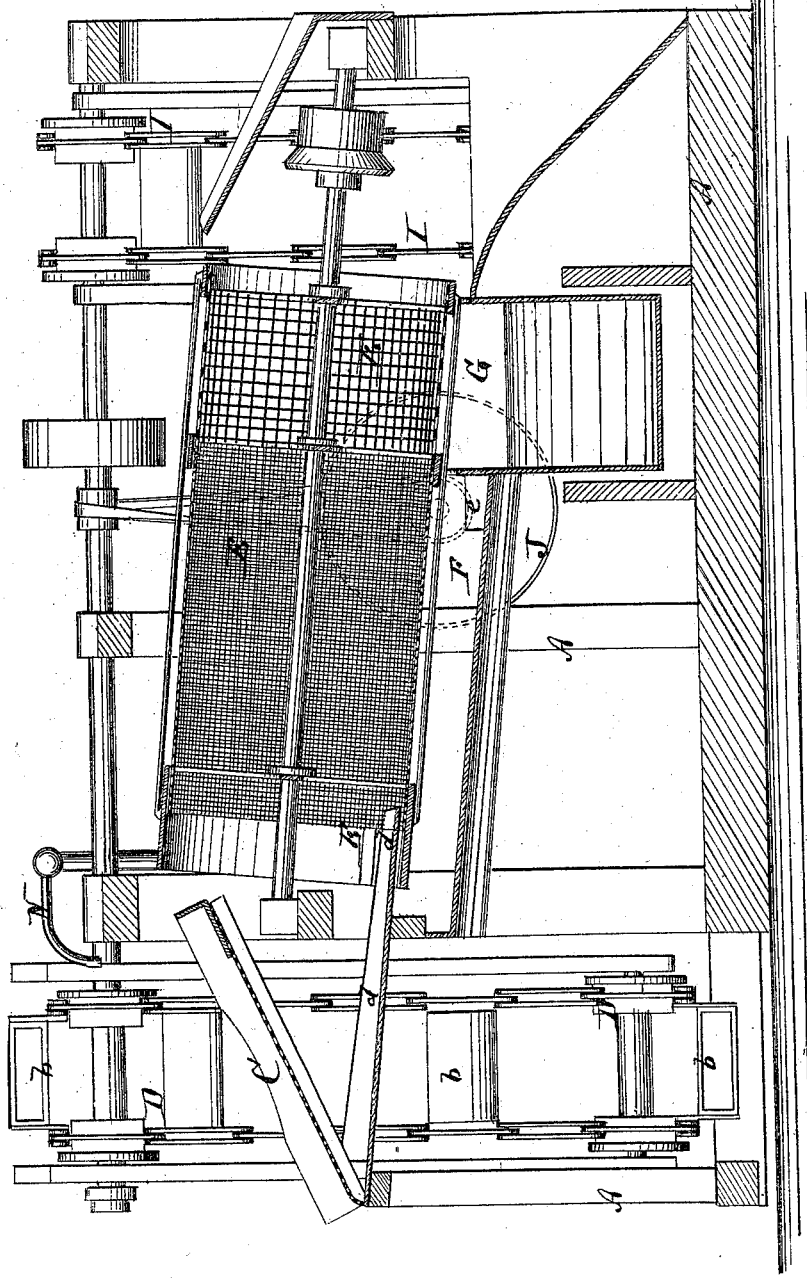

N. J. KELLER.
Improvement in Sand and Gravel Separating-Machines.
No. 126,968. Patented May 21, 1872.
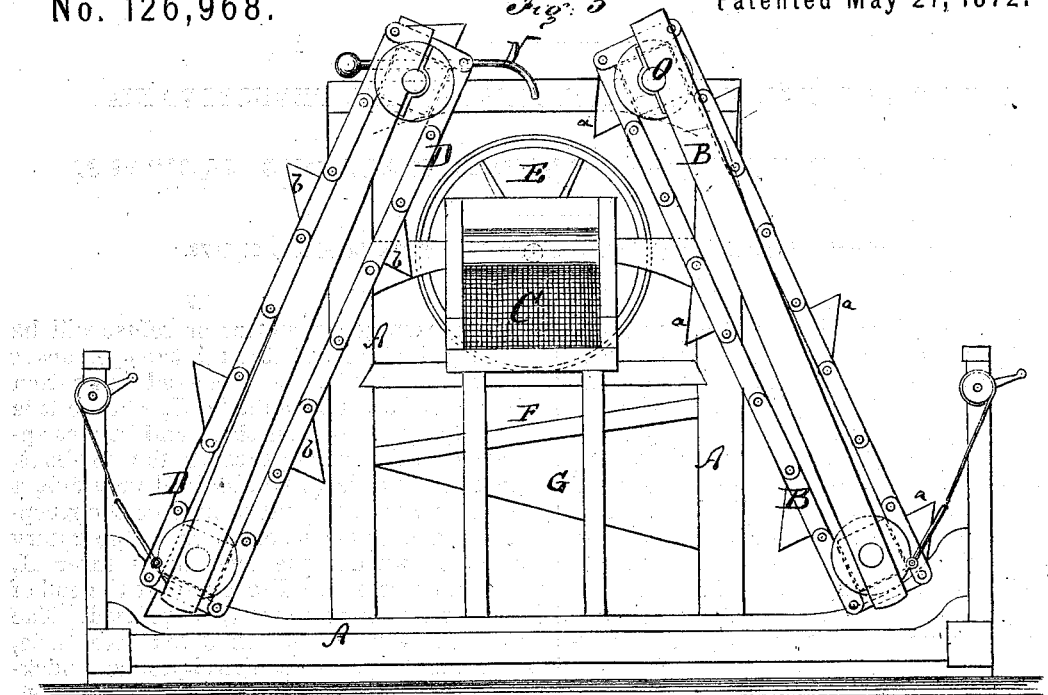
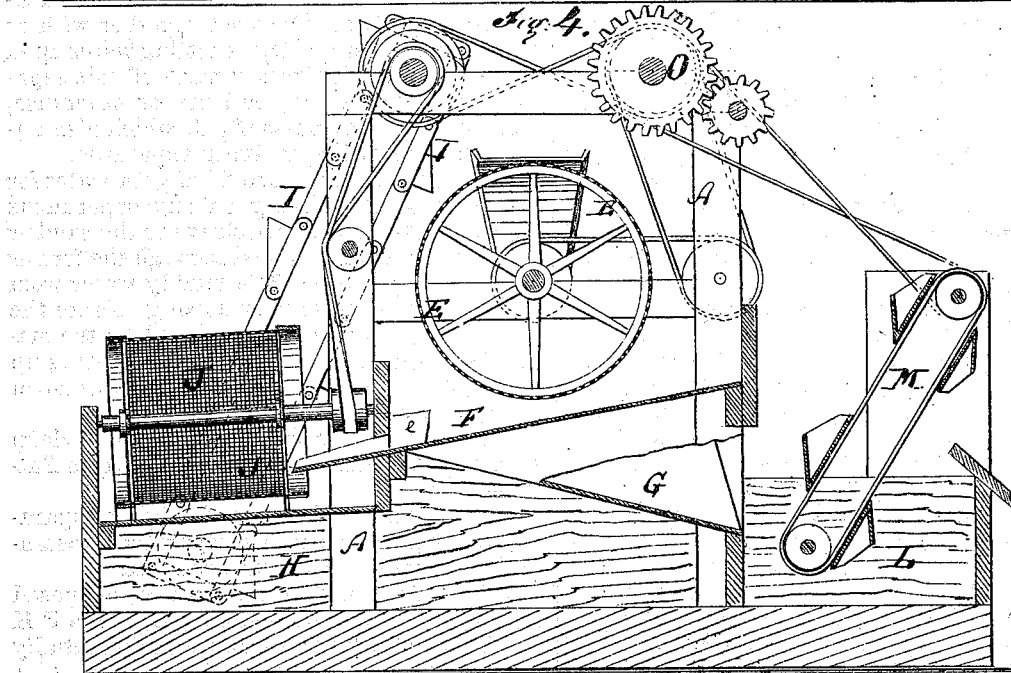

126,968

UNITED STATES PATENT OFFICE.

NICHOLAS J. KELLER, OF EAST BIRMINGHAM, PENNSYLVANIA.

IMPROVEMENT IN SAND AND GRAVEL SEPARATING MACHINES.

Specification forming part of Letters Patent No. 126,968, dated May 21, 1872.

Specification describing a new and Improved Gravel and Sand Separating Machine, invented by NICHOLAS J. KELLER, of East Birmingham, in the county of Allegheny and State of Pennsylvania.

Figure 1 represents a plan or top view, partly in section, of my improved separating-machine. Fig. 2 is a vertical longitudinal section of the same on the line $c\,c$, Fig. 1. Fig. 3 is an end elevation; and Fig. 4, a vertical transverse section of the same on the line $k\,k$, Fig. 1.

Similar letters of reference indicate corresponding parts.

This invention relates to a new machine for separating sand and gravel or other materials from the matter elevated by dredging-machines, and thereby to utilize the valuable constituents of the material so elevated. The invention consists in the combination of such a separating-machine with a dredge boat or apparatus for the purpose above set forth. The invention also consists in several details of improvement in the arrangement of said separating-machine, as hereinafter more fully described.

A in the drawing represents the frame-work of the separating-machine. It is by suitable means coupled to a dredge-boat or dredging apparatus, from which an endless chain or apron, B, extends over one end of the separator. This apron or chain B conveys in its buckets $a\,a$ all the matter raised by the dredge upon an inclined perforated spout, C, which is securely fixed at one end of the frame A. Water is conveyed to the same spout C by another endless chain or apron, D, in buckets $b\,b$, and serves to so loosen the mud on C that all gravel and sand will pass through, but all other matter over it to be discharged. What passes through the sieve C is on an inclined table, $d$, carried toward the inner part of the separator into the higher end of an inclined perforated cylinder, E. This cylinder, being covered with wire-screen and revolved by suitable mechanism, separates the sand and gravel by letting the sand pass through its finer meshes into a box, F, and the gravel through the larger meshes at the lower part into a box, G. All extraneous matter or refuse will be discharged overboard through the open lower end of the cylinder E. The sand flows from the box F into a receptacle, H, whence it is taken up by an endless chain and bucket apparatus, I, for conveyance to the flat-boat. When the sand is to be obtained very fine, a gate, $e$, is moved to shut it off from the receptacle H and cause it to enter a fine rotary screen, J, whence the finer parts enter H, while the coarser are discharged at the end of J into another receptacle, or refused. The gravel flows from the box G to a receptacle, L, whence it is, by an endless apron and bucket, M, conveyed to the flat-boat. A steam siphon-pump, N, may be used together with or apart from the apron D, for letting water upon the spout C. The rotary parts of this separator receive motion, by belts or otherwise, from a main driving-shaft, O, which also imparts motion to the dredging apparatus.

The boxes H and L are filled with water for the purpose of carrying off any superfluous substance which may yet cleave to the sand or gravel after having passed through the former part of the process. The muddy water from these boxes is continually flowing off into the river from the agitation produced by the materials falling into, and the buckets lifting up therefrom, the sand or gravel as it settles down in the bottom of the boxes.

Having thus described my invention, I claim as new and desire to secure by Letters Patent—

1. The combination of a dredging apparatus with a sand and gravel separator, substantially as herein shown and described.

2. The gravel and sand separator, composed of the spout C, screen-cylinder E, boxes F H and G L, and elevators I and M, substantially as set forth.

3. The gate $e$ arranged in the box F to control the escape of sand into the box H or screen J, as specified.

NICHOLAS J. KELLER.

Witnesses:
 JAMES SALISBURY,
 ROBERT M. WILSON.